United States Patent [19]
Bolt et al.

[11] Patent Number: 4,942,011
[45] Date of Patent: Jul. 17, 1990

[54] PROCESS FOR PREPARING SILICON CARBIDE FIBERS

[75] Inventors: John D. Bolt, Landenberg; Steven M. Dinh, Chadds Ford, both of Pa.; Lee A. Silverman, Newark, Del.

[73] Assignee: E. I. Du Pont de Nemours and Company, Wilmington, Del.

[21] Appl. No.: 189,812

[22] Filed: May 3, 1988

[51] Int. Cl.$^5$ .................................. D01F 9/14
[52] U.S. Cl. ........................ 264/29.2; 264/56; 264/63; 264/210.6; 264/210.8; 264/211; 264/211.17
[58] Field of Search .............. 264/29.2, 211, 56, 60, 264/63, 211.14, 210.6, 210.8, 211.17

[56] References Cited

U.S. PATENT DOCUMENTS

| | | | |
|---|---|---|---|
| 4,052,430 | 10/1977 | Yajima et al. | 260/448.2 D |
| 4,068,037 | 1/1978 | Debolt et al. | 428/368 |
| 4,097,294 | 1/1978 | Rice et al. | 106/43 |
| 4,126,652 | 11/1978 | Oohara et al. | 264/29.6 |
| 4,144,207 | 3/1979 | Ohnsorg | 106/43 |
| 4,497,787 | 2/1985 | Schilling, Jr. et al. | 423/345 |
| 4,560,526 | 12/1985 | Okumura | 264/63 |
| 4,604,367 | 8/1986 | Takamizawa et al. | 501/95 |
| 4,663,105 | 5/1987 | Sakai et al. | 264/66 |
| 4,693,988 | 9/1987 | Boecker et al. | 501/89 |
| 4,702,869 | 10/1987 | Higuchi et al. | 264/65 |
| 4,702,960 | 10/1987 | Ogman | 428/367 |

FOREIGN PATENT DOCUMENTS

| | | |
|---|---|---|
| 200326A | 12/1986 | European Pat. Off. . |
| 61-132509 | 6/1986 | Japan . |
| 1514171 | 6/1978 | United Kingdom . |
| 2024789 | 1/1980 | United Kingdom . |
| 2066800 | 7/1981 | United Kingdom . |

OTHER PUBLICATIONS

Ceramic Bulletin 62[8] 1983, 889-891.
Phila. Trans. R. Soc. Lond. A-294, 419-426 (1980).
J. Am. Ceram. Soc. 69[5], C-106-C108 (1986).
Comm. of American Ceramic Soc., 1984, C132-133.

*Primary Examiner*—Hubert C. Lorin

[57] ABSTRACT

Dense highly pure fibers of silicon carbide are made by incorporating silicon carbide particles into a polymeric silicon carbide precursor, spinning and sintering.

13 Claims, No Drawings

PROCESS FOR PREPARING SILICON CARBIDE FIBERS

BACKGROUND OF THE INVENTION

This invention relates to a method for making silicon carbide fibers of high purity and high density, and to the fibers themselves.

Silicon carbide is recognized as having excellent properties for high temperature applications. Silicon carbide articles have been made by sintering silicon carbide powder as taught in U.S. Pat. Nos. 4,144,207, 4,663,105, 4,693,988 and 4,702,869. However, formation of the desired shapes from particles can be difficult, and the use of silicon carbide particles does not lend itself to the manufacture of silicon carbide fibers.

Seyferth and Wiseman, Am. Ceram. Soc., July 1984, pp. C132,133, report combining silicon carbide particles and polysilazane and sintering the mixture in a nitrogen atmosphere to form a bulk ceramic object. Under the conditions used, the polymer yields a substantial amount of silicon nitride. Fibers from the polymer are reported, but not from the combination of polymer and silicon carbide particles. U.K. Pat. No. 2,024,789 describes particular silanes from which shapes can be formed and sintered in an inert atmosphere to make silicon carbide shapes. Green fibers drawn from polymer are mentioned and the use of powdered silicon carbide as a filler is mentioned. However, there is no description of forming fibers from a powder/polymer mixture.

Silicon carbide fibers have been manufactured by drawing silicon-containing organic polymers into fibers and pyrolysing such fibers to produce silicon carbide fibers. This is taught in U.S. Pat. No. 4,126,652, EP No. 0 200 326, and U.S. Pat. No. 4,052,430. In a somewhat similar way, silicon metal can be incorporated in pitch or polyacrylonitrile fibers and pyrolysed to produce silicon carbide fibers. See U.K. No. 1,514,171, U.K. Application No. 2,066,800 and U.S. Pat. No. 4,126,652. However, none of these polymers when spun into fibers are sufficiently stable to be sintered without first partially oxidizing in order to cross-link the polymers. This introduces impurities into the final silicon carbide fibers that are difficult to remove. It prevents reaching high purity levels which in turn prevents achieving densities approaching theoretical and prevents achieving optimum final silicon carbide fiber properties.

U.S. Pat. No. 4,604,367 reports that boron containing polycarbosilanes are spun and irradiated to crosslink the polymers so as to eliminate oxygen. The strengths of such fibers are better at high temperatures than those in the previous examples and the X-ray pattern indicates extremely small grain size of entirely beta silicon carbide. The irradiation takes up to one hour.

Silicon carbide fibers have also been manufactured by chemical vapor deposition of silicon carbide on a substrate such as carbon fiber. Chemical vapor deposition can yield highly pure high density silicon carbide, but this method cannot produce a fiber which is silicon carbide throughout, and is difficult and expensive. Chemical vapor deposition is taught in U.S. Pat. Nos. 4,068,037 and 4,702,960.

This invention provides a method to make dense, high purity silicon carbide fibers which do not require the use of a substrate in their manufacture.

SUMMARY OF THE INVENTION

Polycrystalline silicon carbide fibers are conveniently made by spinning a polymeric silicon carbide precursor polymer to which silicon carbide particles have been added. The crystalline silicon carbide if added in sufficient quantity, gives the green (unfired) fibers surprising resistance to slumping so they can be sintered without a prior oxidation step. Of course, the fiber will shrink during the sintering, but it will not deform as much as an unsupported green body which contains no crystalline silicon carbide. The amount of crystalline silicon carbide that can be added will depend on the shape and size distribution of the particles. It is preferred to maximize the density of the sintered fiber by providing sufficient polymer to fill the volume between the densely packed particles. If the particles are roughly spherical and have a normal size distribution, the volume ratio of particles to precursor, such that the polymer will just fill the void spaces between the particles of silicon carbide, is about 2. As the polymer melts during the initial heating, it is drawn by capillary forces into the pores between the particles. As a result, the green fiber does not slump when the polymer melts. In calculating such a volume ratio particle volume is calculated by dividing the mass of the particles by the theoretical density of silicon carbide. Polymer volume is measured directly or the mass divided by polymer density yields volume. When using high ratios of solid to polymer, it may be useful to use an agent which will readily disperse the silicon carbide particles in the polymer, and ensure that the particles are uniformly wetted by the polymer or dispersing medium. Preferred silicon carbide particles are equiaxed alpha phase powder.

Any polymeric silicon carbide precursor can be used in this invention. These include polycarbosilanes, polysilazanes, polysilanes, organo-silsesquioxane-containing sol-gels and organopolysiloxanes. Polycarbosilanes are preferred in the practice of this invention.

Fibers made by this invention consist essentially of silicon carbide. The concentration of silicon carbide in the fiber is at least 95%, the balance being residual carbon plus sintering aid, as discussed below. They do not require the presence of a substrate or core fiber. They have densities that exceed 3, preferably exceeding 3.1. as compared to the theoretical density of 3.22. The fibers have diameters of from 10 to 200 micrometers. More preferred fibers have diameters of from 20 to 50 micrometers. The microstructure of the fibers of this invention is closely packed grains of silicon carbide of from 0.5 to 10 micrometers in size.

In order to obtain the maximum density of silicon carbide in the fiber, use of a sintering aid is preferred. The sintering aid can be incorporated in the polymer or mixed with the silicon carbide particles to provide uniform distribution in the green fiber. Sintering aid can be employed in amount of 0.2 to 5 weight percent based on the weight of silicon carbide in the sintered fiber.

DETAILED DESCRIPTION

Silicon-containing polymers that serve as polymeric silicon carbide precursors in this invention are well known in the art. EP No. 0200326 discloses these polymers and references regarding their preparation. This disclosure is set out below.

Examples of suitable polycarbosilanes for use in this invention include polycarbosilanes as described by Yajima et al. in U.S. Pat. Nos. 4,052,430 (issued Oct. 4, 1977), 4,100,430 (issued July 11, 1978), 4,159,259 (issued June 26, 1979), 4,220,600 (issued Sept. 2, 1980), 4,283,376 (issued Aug. 11, 1981), 4,336,215 (issued June 22, 1982), 4,342,712 (issued Aug. 3, 1982), 4,347,347 (issued Aug. 31, 1982), 4,358,576 (issued Nov. 9, 1982), 4,359,559 (issued Nov. 16, 1982), 4,399,232 (issued Aug. 16, 1983), and 4,455,414 (issued June 19, 1984). Other polycarbosilanes suitable for use in this invention include polycarbosilanes prepared by the method of Iwai et al. in U.S. Pat. No. 4,377,677 (issued Mar. 22, 1983), branched polycarbosilanes as described by Schilling, Jr. et al. in U.S. Pat. No. 4,414,403 (issued Nov. 8, 1983), and the polycarbosilanes described in British Patent No. 2,106,528. The polycarbosilanes described by Bujalski in U.S. Patent Application Ser. No. 678,122 (filed Dec. 4, 1984), may also be used in this invention. Still other polycarbosilanes may also be suitable for use in this invention.

Examples of polysilazanes suitable for use in this invention include polysilazanes as described by Gaul in U.S. Pat. Nos. 4,312,970 (issued Jan. 26, 1982), 4,340,619 (issued July 20, 1982), 4,395,460 (issued July 26, 1983), and 4,404,153 (issued Sept. 13, 1983). Suitable polysilazanes also include those described by Haluska in U.S. Pat. No. 4,482,689 (issued Nov. 13, 1984) and by Seyferth et al. in U.S. Pat. No. 4,397,828 (issued Aug. 9, 1983). Other polysilazanes suitable for use in this invention are disclosed by Cannady in U.S. patent applications Ser. No. 555,755 (filed Nov. 28, 1983) (now U.S. Pat. No. 4,540,803), Ser. No. 627,260 (filed July 2, 1984) (now U.S. Pat. No. 4,535,007) and Ser. No. 689,258 (filed Jan. 7, 1985) (now U.S. Pat. No. 4,543,344), by Bujalski in U.S. Patent Application Ser. No. 653,003 (filed Sept. 21, 1984) (now U.S. Pat. No. 4,647,855), and by Baney et al. in U.S. Patent Applications Ser. No. 652,938 (filed Sept. 21, 1984) and Ser. No. 653,939 (filed Sept. 21, 1984). Still other polysilazanes may be suitable for use in this invention.

Examples of polysilanes suitable for use in this invention include polysilanes as described by Barney et al. in U.S. Pat. Nos. 4,298,558 (issued Nov. 3, 1981), 4,298,559 (issued Nov. 3, 1981), 4,310,651 (issued Jan. 12, 1982), 4,314,956 (issued Feb. 9, 1982), and Re. 31,447 (issued Nov. 22, 1983). Other suitable polysilanes are described by Baney in U.S. Pat. Nos. 4,310,481 (issued Jan. 12, 1982) and 4,310,482 (issued Jan. 12, 1982), and by Haluska in U.S. Patent Application Ser. No. 647,329 (filed Sept. 4, 1984) (now U.S. Pat. No. 4,546,163). Still other polysilanes may be useful in the practice of this invention.

Examples of suitable organosilsesquioxane-containing sol-gels which are useful in this invention include organosilsesquioxane-containing sol-gels as described by January in U.S. Pat. No. 4,472,510 (issued Sept. 18, 1984). Still other organosilsesquioxane-containing sol-gels may be useful in this invention.

Examples of suitable polyorganosiloxanes which are useful in this invention include polyorganosiloxanes containing boron as described by Yajima et al. in U.S. Pat. No. 4,152,509 (issued May 1, 1979). Still other polyorganosiloxanes may be useful in this invention.

Some polycarbosilanes are commercially available. An example is "Nicalon" polycarbosilane X9-6348. It is derived by the action of sodium on dichloromethylsilane and is produced by Nippon Carbon and distributed by Dow Corning.

Silicon carbide particles are commercially available in both alpha and beta form. The alpha form is preferred. Particles having an average particle size of 0.8 micrometers with no particles larger than 6 micrometers are commercially available and suitable for this invention. In general, the smaller the particle size, the more readily sintering is achieved.

Dispersing agents for silicon carbide particles are also commercially available. A suitable dispersing aid is purified OLOA 1200 from the Oronite Additives division of Chevron. It is described in the literature as a polyisobutylene chain attached to one side of a succinimide ring with a bifunctional amine group attached to the other side of the ring. OLOA comes in light mineral oil, which is stripped by dissolving in hexane, then mixing the solution with acetone. The active compound precipitates, and excess solvent is allowed to evaporate in an open container. Dispersing aids can include organic and inorganic surfactants, fish oils, large organic acids (oleic and stearic, e.g.) and bases, and their salts, inorganic acids and bases, and their salts.

Sintering aids are commercially available. In general, boron and aluminum containing inorganic and organic molecules including polymers can act as sintering aids as described in U.S. Pat. No. 4,663,105. Carbon, either added as particulate material or as a product of the pyrolysis of the preceramic polymer can also serve as a sintering aid. Preferred sintering aids include calcium oxide and the oxides, nitrides and carbides of aluminum, beryllium and boron. Boron carbide and aluminum nitride are more preferred as sintering aids.

It is possible to mix the necessary ingredients together and extrude the mixture to form a fiber. To insure even distribution of ingredients and elimination of particle packing defects, or for ease of spinning of fibers, it is more convenient to dissolve the polymer in a solvent, and to prepare a well-dispersed slurry of dispersing aid, sintering aid and silicon carbide particles in the same dispersing medium. The dissolved polymer and the silicon carbide slurry are then mixed and agitated, as by sonication, until the mixture is free of lumps or agglomerates. It may be necessary to remove some of the solvent by evaporation prior to spinning the desired green fiber. Choice of solvents will depend on the solubility of the polymer, the wetting behavior of silicon carbide and the desired volatility, but solvents such as xylene, methylene chloride, hexane, or mixtures of these solvents have been used effectively. Both wet and dry spinning techniques may be used.

Fibers are spun by forcing the polymer/silicon carbide dispersion through a spinneret. The fibers may be attenuated by drawing. Residual solvent is allowed to evaporate and the fibers are dried prior to sintering. The green fibers are sintered by heating to a temperature of from about 1800° C. to 2200° C. in an inert or reducing atmosphere. The higher temperatures reduce heating times. This heating process can be gradual, but it need not be. Since addition of solid particles to the precursor makes the fiber sufficiently resistant to slumping as the temperature is raised to the point of sintering, and no intermediate cross-linking oxidation is necessary, the temperature can be raised to sintering temperature directly from room temperature. The use of inert or reducing atmospheres eliminates the introduction of oxygen as an impurity into the fiber. For fibers, sintering for 60 minutes at 2000° C. has been sufficient. Films can be cast from the polymer/powder dispersions described above and sintered in an inert atmosphere to produce pure, dense silicon carbide films.

EXAMPLE 1

TABLE 1

| Silicon carbide spin mix recipe. | | |
|---|---|---|
| Component | Amount | Comment |
| OLOA 1200 (r) | 2 g. | Dissolve in 15 ml xylene |
| SiC Powder | 40 g. | Add to above |
| $B_4C$ powder | 0.4 g. | Add to above |
| Polycarbosilane ("Nicalon" X9-6348) | 6.6 g. | Dissolve in 10 ml xylene |

The dispersing aid (OLOA 1200) was dissolved in the solvent(xylene). The ceramic powders (commercially available alphasilicon carbide and boron carbide) were added and the resulting solution stirred until fluid. In another container, the polycarbosilane was dissolved in xylene. This solution was then added to the powder slurry and stirred.

In order to insure the homogeneity of the dope, an excess of solvent over that needed for spinning was used during the mixing steps. In order to successfully spin, this solvent was removed to raise the viscosity of the dope. The excess solvent was evaporated by stirring in an open container on a hot plate. As the mix became more viscous, the stir bar was removed and stirring was continued by hand. Solvent was removed until the dope became quite viscous and dilatant at 60° C. The mix was finally covered and cooled to room temperature. When cool, the leathery mixture was scooped out and put in a twin-piston spinning cell. Mixing was completed in four hours at 70° C. while pumping between the two halves of the cell.

The mix was extruded at 70° C. from the twin-piston cell into a press spin unit. The fiber was spun through a 13 mil spinneret at 70° C. and wound on 6 inch bobbins. Wind up rates in excess of 70 m/min were used and the fiber was attenuated by a factor of 19. Because the proper amount of solvent remained after evaporation, the fiber surface dried during the draw process so that it does not stick to the rolls. The inside of the fiber was still wet at this point, allowing the fiber to be bent without breaking. The drawn fibers were cut from the roll and allowed to dry while hanging vertically in short lengths.

Sintering was done in a Centorr graphite tube furnace. The as-spun, dried fibers were put in a carbon boat, and the assembly placed in the furnace. The heating cycle was a slow heat to 1600° C. (so as not to shock the heating element), and then heated to 2000 C under argon at 20° C. per minute. The fibers were held at that temperature for one hour.

EXAMPLE 2

TABLE 2

| Silicon carbide spin mix recipe. | | |
|---|---|---|
| Component | Amount | Comment |
| OLOA 1200 (r) | 1.8 g. | Dissolve in 15 ml xylene |
| SiC Powder | 80 g. | Add to above |
| $B_4C$ powder | 0.8 g. | Add to above |
| Polycarbosilane ("Nicalon" X9-6348) | 13.2 g. | Dissolve in 10 ml xylene |

The dispersing aid (OLOA 1200) was dissolved in the solvent (xylene). The ceramic powders (commercially available alphasilicon carbide and boron carbide) were added and the resulting solution was stirred until it was fluid. The slurry was then sonicated to break up agglomerates. In another container the polycarbosilane was dissolved in xylene. This solution was then added to the powder slurry and stirred. After this, the dispersion was sonicated again to fully mix the components.

The dispersion was loaded into a twin-piston cell and mixed as above. Fibers were then spun directly from the cell through an alumina ceramic spinneret with a 5 mil diameter opening and wound onto 3 inch bobbins. The as-spun fiber averaged between 40 and 60 microns in diameter. The fiber was cut off of the roll and dried, then fired to 1900° C. in a similar manner as the previous example. Densities as high as 3.19 were obtained. The average strength of 15 0.25 inch gage length breaks was 95 kpsi, with a maximum of 152 kpsi. The average Young's modulus was 10 mpsi, with a maximum of 15 mpsi. Identical green fibers were fired to 2000 C as in Example 1. The average strength of 16 breaks was 101 kpsi, with a maximum of 192 kpsi. The young's modulus average was 12 mpsi, with a maximum of 22 mpsi.

EXAMPLE 3

TABLE 3

| Silicon carbide spin mix recipe. | | |
|---|---|---|
| Component | Amount | Comment |
| OLOA 1200 (r) | 1.8 g. | Dissolve in 15 ml xylene |
| SiC Powder | 80 g. | Add to above |
| AlN powder | 0.8 g. | Add to above |
| Polycarbosilane ("Nicalon" X9-6348) | 13.2 g. | Dissolve in 10 ml xylene |

The dispersing aid (OLOA 1200) was dissolved in the solvent(xylene). The ceramic powders (commercially available alphasilicon carbide and aluminum) were added and the resulting solution was stirred until it was fluid. The slurry was then sonicated to break up agglomerates. In another container the polycarbosilane was dissolved in xylene. This solution was then added to the powder slurry and stirred. After this, the dispersion was sonicated again to fully mix the components.

The dispersion was loaded into a twin-piston cell and mixed as above. Fibers were then spun directly from the cell through a 5 mil spinneret and wound onto 3 inch bobbins. The as-spun fiber diameter was as low as 28 microns.

We claim:

1. A process for making silicon carbide fibers by mixing a polymeric silicon carbide precursor with silicon carbide particles, spinning the mixture to form a green fiber, drawing the fiber to attenuate it and heating the fiber wherein the volume ratio of silicon carbide particles to polymeric silicon carbide precursor is selected so that the green fibers can be heated without slumping, and so that the density of the fiber following heating is maximized.

2. The process of claim 1 wherein the polymeric silicon carbide precursor is selected from the group consisting of polycarbosilanes, polysilazanes, polysilanes, organosilsesquioxane-containing sol-gels and organopolysiloxanes.

3. The process of claim 1 wherein the polymeric silicon carbide precursor is a polycarbosilane, the silicon carbide particles are equiaxed alpha-phase powder and the volume ratio of silicon carbide particles to polycarbosilane is approximately 2.

4. The process of claims 1, 2 or 3 wherein the polymeric silicon carbide precursor is dissolved in a solvent, the heated fiber is from 10 to 200 micrometers in diameter, and wherein the fiber is heated to sintering temperature in an inert or reducing atmosphere.

5. The process of claims 1, 2 or 3 wherein the fiber is from 20 to 50 micrometers in diameter.

6. The process of claims 1, 2 or 3 wherein the silicon carbide-polymeric silicon carbide precursor mixture contains an agent for dispersing silicon carbide in the precursor.

7. The process of claims 1, 2 or 3 wherein the polymeric silicon carbide precursor is dissolved in a solvent, the silicon carbide-polymeric silicon carbide precursor mixture contains a silicon carbide dispersing agent and wherein the fiber is from 10 to 200 micrometers in diameter and wherein the fiber is heated to sintering temperature in an inert or reducing atmosphere.

8. The process of claims 1, 2 or 3 wherein the silicon carbide-polymeric silicon carbide precursor mixture contains a silicon carbide dispersing agent and wherein the fiber is from 20 to 50 micrometers in diameter.

9. The process of claims 1, 2 or 3 wherein the silicon carbide-polymeric silicon carbide precursor mixture contains a silicon carbide sintering aid.

10. The process of claims 1, 2 or 3 wherein the polymeric silicon carbide precursor is dissolved in a solvent, the silicon carbide-polymeric silicon carbide precursor mixture contains a silicon carbide sintering aid and wherein the fiber is from 10 to 200 micrometers in diameter and wherein the fiber is heated to sintering temperature in an inert or reducing atmosphere.

11. The process of claims 1, 2 or 3 wherein the silicon carbide-polymeric silicon carbide precursor mixture contains a silicon carbide sintering aid and wherein the fiber is from 20 to 50 micrometers in diameter.

12. The process of claims 1, 2 or 3 wherein the polymeric silicon carbide precursor is dissolved in a solvent, the silicon carbide-polymeric silicon carbide precursor mixture contains from 0.2 to 5% based on the weight of the silicon carbide in the heated fiber of a silicon carbide sintering aid selected from the group consisting of carbon, calcium oxide and the oxides, carbides and nitrides of aluminum, beryllium and boron and wherein the fiber is from 20 to 50 micrometers in diameter and wherein the fiber is heated to sintering temperature in an inert or reducing atmosphere.

13. The process of claims 1, 2 or 3 wherein the polymeric silicon carbide precursor is dissolved in a solvent, the silicon carbide-polymeric silicon carbide precursor mixture contains from 0.2 to 5% based on the weight of the silicon carbide in the heated fiber of a silicon carbide sintering aid selected from the group consisting of aluminum nitride and boron carbide and wherein the fiber is from 20 to 50 micrometers in diameter and wherein the fiber is heated to sintering temperature in an inert or reducing atmosphere.

* * * * *